United States Patent
Gonzalez Delgado et al.

(10) Patent No.: US 9,541,010 B2
(45) Date of Patent: Jan. 10, 2017

(54) ENGINE INCLUDING CAMSHAFT WITH LOBE FEATURES FOR INTERNAL EXHAUST GAS RECIRCULATION

(75) Inventors: Manuel Angel Gonzalez Delgado, Rochester Hills, MI (US); Charles Dean, Royal Oak, MI (US); Joseph J. Moon, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 455 days.

(21) Appl. No.: 13/547,354

(22) Filed: Jul. 12, 2012

(65) Prior Publication Data

US 2014/0013739 A1     Jan. 16, 2014

(51) Int. Cl.
*F02D 13/02* (2006.01)
*F01L 1/26* (2006.01)
*F01L 13/00* (2006.01)

(52) U.S. Cl.
CPC .......... *F02D 13/0273* (2013.01); *F02M 26/01* (2016.02); *F01L 1/267* (2013.01); *F01L 13/0036* (2013.01); *F01L 2800/10* (2013.01); *Y02T 10/121* (2013.01); *Y02T 10/18* (2013.01)

(58) Field of Classification Search
CPC ............ F01L 13/06; F01L 13/065; F01L 1/08; F01L 2013/0089; F01L 2105/00; F01L 2800/10; F01L 13/0036; F01L 1/267; F02D 13/0207; F02D 13/0249; F02D 13/0273; F02D 13/04; F02M 25/0752; Y02T 10/121; Y02T 10/18
USPC ............. 60/605.2, 274; 123/320, 321, 90.15, 123/90.16, 90.39, 90.47
See application file for complete search history.

(56) References Cited

U.S. PATENT DOCUMENTS

| | | | | |
|---|---|---|---|---|
| 4,452,040 A | * | 6/1984 | Kobashi | F01N 3/0231 60/274 |
| 5,806,308 A | * | 9/1998 | Khair et al. | 60/278 |
| 6,152,104 A | * | 11/2000 | Vorih et al. | 123/322 |
| 6,354,254 B1 | * | 3/2002 | Usko | 123/90.16 |
| 6,564,767 B1 | * | 5/2003 | Reese | 123/184.53 |
| 6,918,363 B2 | * | 7/2005 | Daigo | F01L 1/267 123/90.15 |

(Continued)

OTHER PUBLICATIONS

AEI Publication titled "Mazda Readies Skyactive Engines" dated Feb. 1, 2011.

*Primary Examiner* — Nicholas J Weiss
*Assistant Examiner* — Paul Thiede
(74) *Attorney, Agent, or Firm* — Harness, Dickey & Pierce, P.L.C.

(57) ABSTRACT

An engine assembly includes a camshaft having an exhaust cam lobe defining an exhaust lift region and an exhaust base circle region and an EGR cam lobe defining an EGR lift region and an EGR base circle region. The EGR lift region is rotationally offset from the exhaust lift region and the EGR base circle region is rotationally aligned with the exhaust lift region. An exhaust valve lift mechanism is engaged with an exhaust valve, the exhaust cam lobe and the EGR cam lobe and is operable in first and second modes. The exhaust valve remains closed when the EGR lift region engages the exhaust valve lift mechanism during the second mode and the exhaust valve is opened when the EGR lift region engages the exhaust valve lift mechanism during the first mode to provide exhaust gas flow into the combustion chamber during an intake stroke of the combustion chamber.

14 Claims, 5 Drawing Sheets

(56) References Cited

U.S. PATENT DOCUMENTS

| | | | |
|---|---|---|---|
| 7,934,486 B1* | 5/2011 | Styles | F01N 3/2066 123/406.23 |
| 2011/0114067 A1 | 5/2011 | Gonzalez Delgado et al. | |
| 2012/0137997 A1 | 6/2012 | Hayman | |

* cited by examiner

ENGINE INCLUDING CAMSHAFT WITH LOBE FEATURES FOR INTERNAL EXHAUST GAS RECIRCULATION

FIELD

The present disclosure relates to engine exhaust gas recirculation systems.

BACKGROUND

This section provides background information related to the present disclosure which is not necessarily prior art.

Internal combustion engines may include exhaust gas recirculation systems to provide exhaust gas to the combustion chambers for a subsequent combustion event. In order to provide exhaust gas flow to the combustion chambers a pressure differential is needed between the exhaust flow path of the engine and the location in the intake system where the exhaust gas is reintroduced.

SUMMARY

An engine assembly may include an engine structure defining a first combustion chamber and first exhaust port in communication with the first combustion chamber, a first exhaust valve located in the first exhaust port, a camshaft and a first exhaust valve lift mechanism. The camshaft may include a first exhaust cam lobe defining a first exhaust lift region and a first exhaust base circle region and a first EGR cam lobe defining a first EGR lift region and a first EGR base circle region. The first EGR lift region may be rotationally offset from the first exhaust lift region in a rotational direction of the camshaft and the first EGR base circle region may be rotationally aligned with the first exhaust lift region. The first exhaust valve lift mechanism may be supported by the engine structure, engaged with the first exhaust cam lobe and the first EGR cam lobe and operable in first and second modes. The first exhaust valve may remain closed when the first EGR lift region engages the first exhaust valve lift mechanism during the second mode and the first exhaust valve may be opened when the first EGR lift region engages the first exhaust valve lift mechanism during the first mode to provide exhaust gas flow into the first combustion chamber during an intake stroke of the first combustion chamber.

In another arrangement, an engine assembly may include an engine structure defining first and second combustion chambers, a first exhaust port in communication with the first combustion chamber and a second exhaust port in communication with the second combustion chamber. The engine assembly may additionally include a first exhaust valve located in the first exhaust port and a second exhaust valve located in the second exhaust port, a camshaft, first and second exhaust valve lift mechanisms and an oil control valve. The camshaft may include a first exhaust cam lobe defining a first exhaust lift region, a first EGR cam lobe defining a first EGR lift region and a first EGR base circle region extending continuously from an ending point of the first EGR lift region to a starting point of the first EGR lift region in a rotational direction of the camshaft, a second exhaust cam lobe defining a second exhaust lift region, and a second EGR cam lobe defining a second EGR lift region and a second EGR base circle region extending continuously from an ending point of the second EGR lift region to a starting point of the second EGR lift region in the rotational direction of the camshaft. The first exhaust valve lift mechanism may be supported by the engine structure, engaged with the first exhaust cam lobe and the first EGR cam lobe and operable in first and second modes. The first exhaust valve may remain closed when the first EGR lift region engages the first exhaust valve lift mechanism during the second mode and may be opened when the first EGR lift region engages the first exhaust valve lift mechanism during the first mode to provide exhaust gas flow into the first combustion chamber during an intake stroke of the first combustion chamber. The second exhaust valve lift mechanism may be supported by the engine structure, engaged with the second exhaust cam lobe and the second EGR cam lobe and operable in the first and second modes. The second exhaust valve may remain closed when the second EGR lift region engages the second exhaust valve lift mechanism during the second mode and may be opened when the second EGR lift region engages the second exhaust valve lift mechanism during the first mode to provide exhaust gas flow into the second combustion chamber during an intake stroke of the second combustion chamber. The oil control valve may be in fluid communication with the first and second exhaust valve lift mechanisms and operable to switch both the first and second exhaust valve lift mechanisms between the first and second modes.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. As used herein, the term "module" refers to an application specific integrated circuit (ASIC), an electronic circuit, and/or a processor (shared, dedicated, or group) and memory that execute one or more software or firmware programs.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
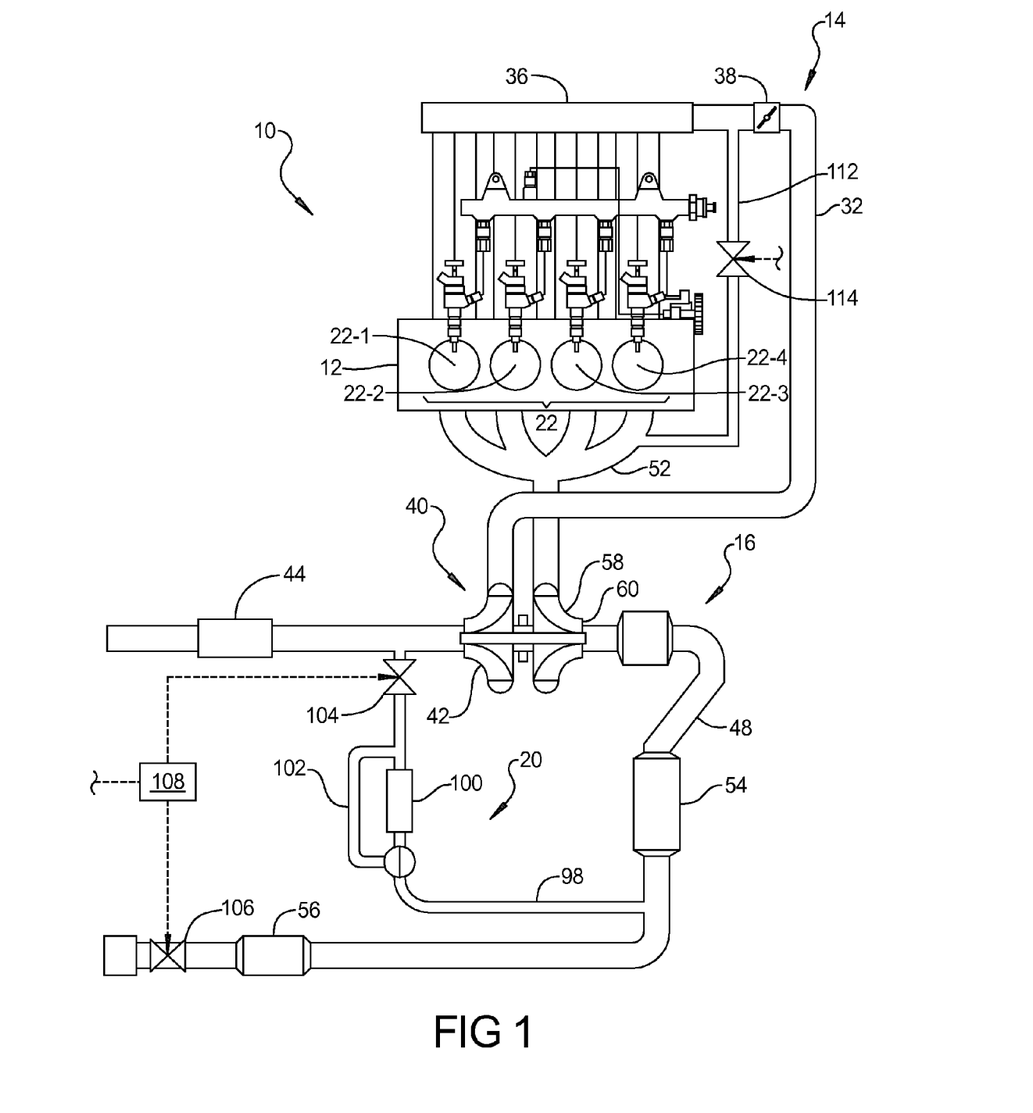
FIG. 1 is a schematic illustration of an engine assembly according to the present disclosure.
Figure 2:
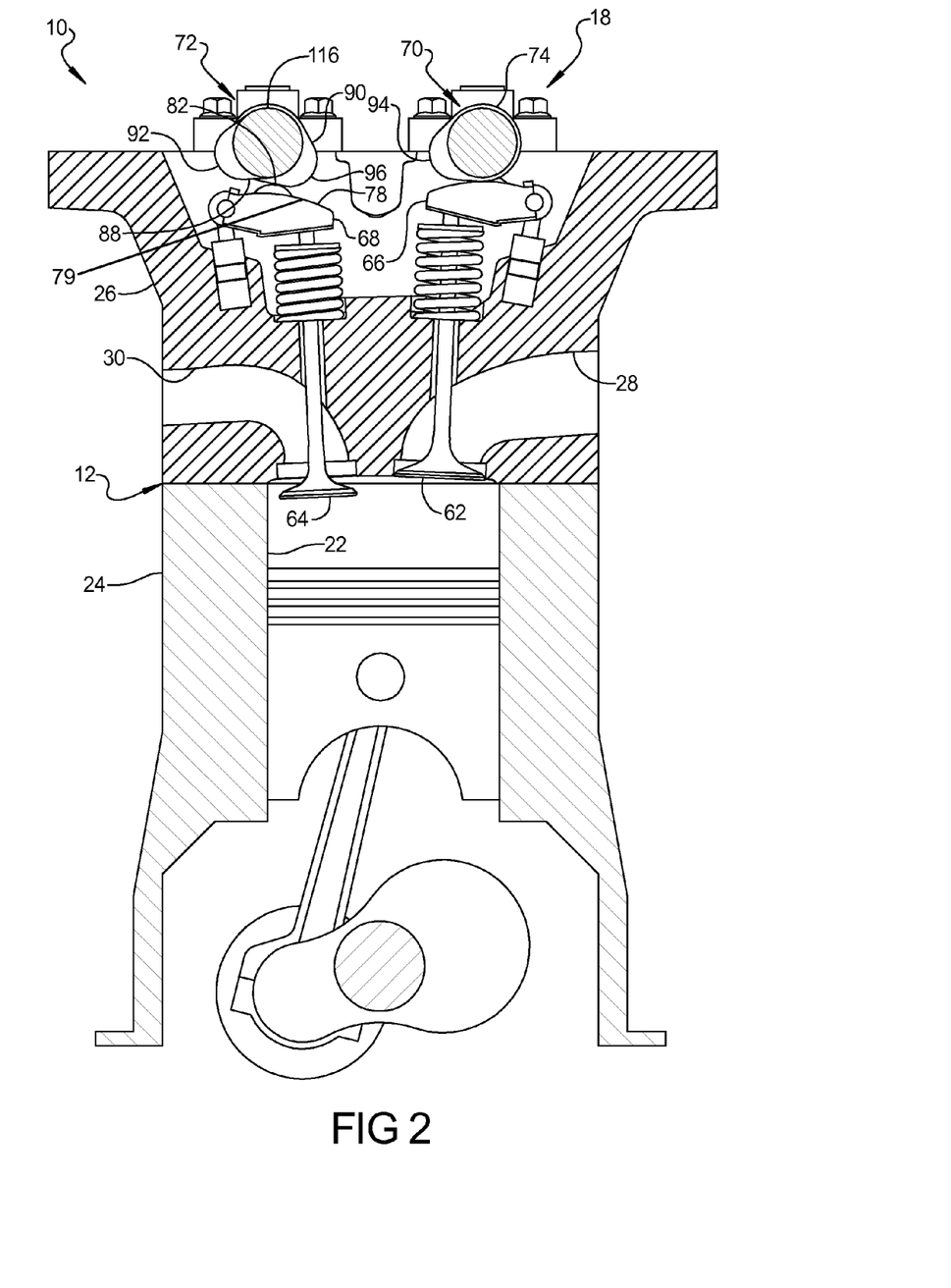
FIG. 2 is a schematic section view of the engine assembly from FIG. 1.

With reference to FIGS. 1 and 2, an engine assembly 10 may include an engine structure 12, an intake system 14, an exhaust system 16, a valvetrain assembly 18 and an exhaust gas recirculation (EGR) assembly 20. The engine structure 12 may define cylinder bores 22 forming combustion chambers. The engine structure 12 may include an engine block 24 defining the cylinder bores 22 and a cylinder head 26 coupled to the engine block 24 and defining intake and exhaust ports 28, 30 in communication with the combustion chambers.

An inline engine configuration having four cylinders (22-1, 22-2, 22-3, 22-4) is schematically shown in FIG. 1 for illustration purposes only with a single cylinder illustrated in the section view shown in FIG. 2 for simplicity. It is understood that the features discussed relative to the cylinder shown in FIG. 2 apply equally to the remaining cylinders of the engine assembly 10. Additionally, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

The intake system 14 may include an intake conduit 32, an intake manifold 36 coupled to the cylinder head 26 and in communication with the intake conduit 32, a throttle valve 38 in the intake conduit 32 and controlling air flow to intake port 28 through the intake manifold 36, a turbocharger 40 including an intake side 42 (compressor) located in the intake conduit 32 and an air cleaner 44 located in the intake conduit 32. The intake conduit 32 may define an air inlet into the intake system 14 and the turbocharger 40 may be in communication with the intake ports 28 via the intake manifold 36. While a single turbocharger 40 is illustrated, it is understood that the present disclosure applies equally to arrangements including multiple turbochargers.

The exhaust system 16 may include an exhaust conduit 48, an exhaust manifold 52 coupled to the cylinder head 26 and in communication with the exhaust conduit 48, and a diesel particulate filter (DPF) 54 and a selective catalytic reduction (SCR) catalyst 56 located in the exhaust conduit 48. While illustrated as including an individual DPF 54 and an individual SCR catalyst 56, it is understood that the present disclosure is not limited to such arrangements. The DPF 54 may alternatively be included in a combined DPF/SCR catalyst. Further, the SCR catalyst 56 may alternatively be located upstream of the DPF 54 or an additional SCR catalyst (not shown) may be included upstream of the DPF 54. The exhaust side 58 (turbine) of the turbocharger 40 may be located in the exhaust conduit 48 and may include a turbine wheel in communication with and driven by exhaust gas flowing through the exhaust conduit 48. The exhaust side 58 of the turbocharger 40 may include a variable exhaust gas outlet 60 that controls an exhaust gas flow restriction through the turbocharger 40. The variable exhaust gas outlet 60 may be in the form of a variable nozzle.

Figure 3:
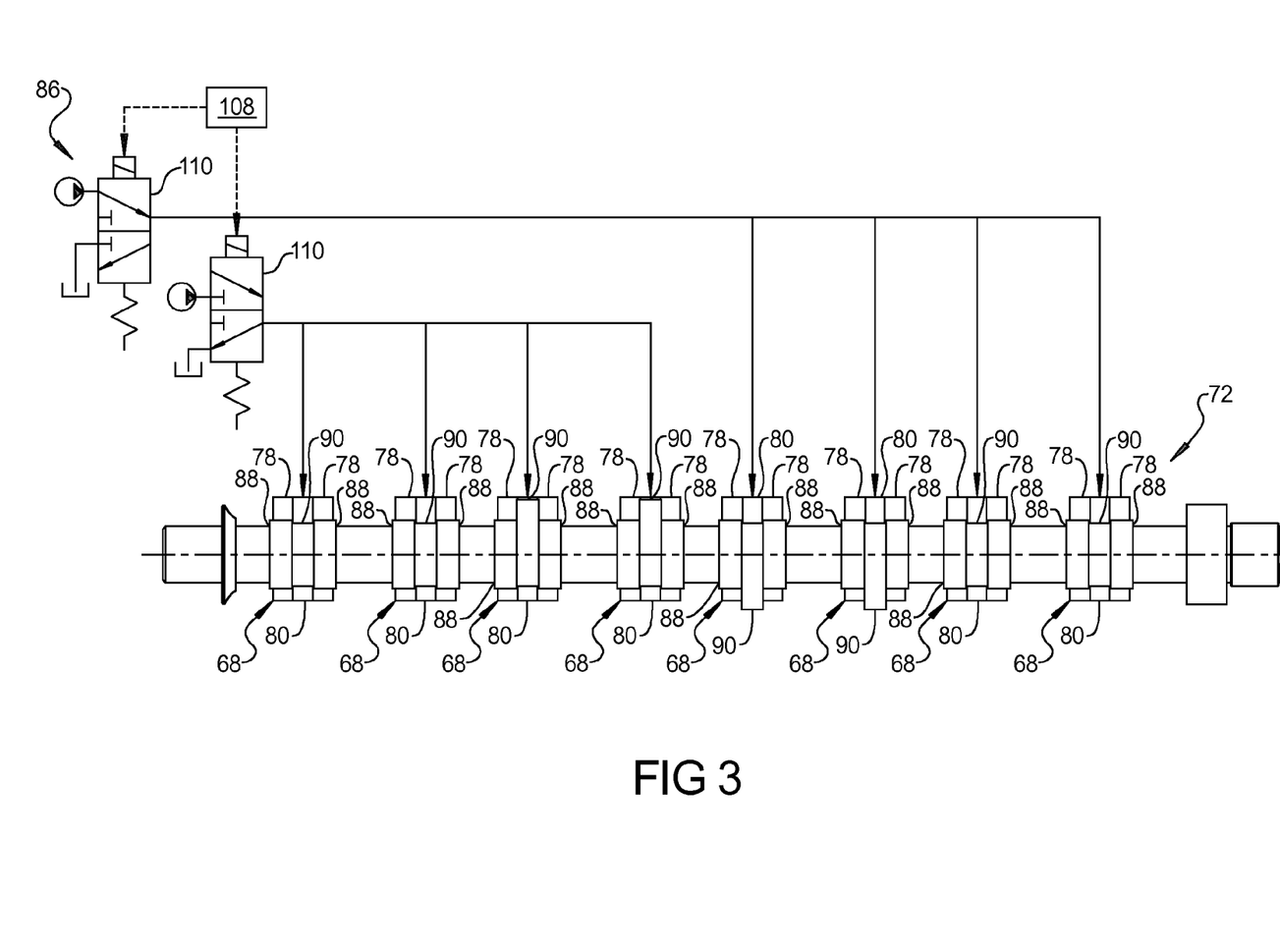
FIG. 3 is a schematic illustration of the valvetrain assembly shown in FIG. 2.

As seen in FIGS. 2 and 3, the valvetrain assembly 18 may include intake valves 62 located in the intake ports 28, exhaust valves 64 located in the exhaust ports 30, intake valve lift mechanisms 66 supported on the cylinder head 26 and engaged with the intake valves 62, exhaust valve lift mechanisms 68 supported on the cylinder head 26 and engaged with the exhaust valves 64, an intake camshaft 70 supported for rotation on the cylinder head 26 and engaged with the intake valve lift mechanisms 66 and an exhaust camshaft 72 supported for rotation on the cylinder head 26 and engaged with the exhaust valve lift mechanisms 68. The intake camshaft 70 may include intake cam lobes 74 engaged with each of the intake valve lift mechanisms 66. The intake camshaft 70 may include an intake cam phaser (not shown) and the intake valve lift mechanism 66 may take a variety of forms including, but not limited to, conventional or variable valve lift mechanisms.

Figure 4:
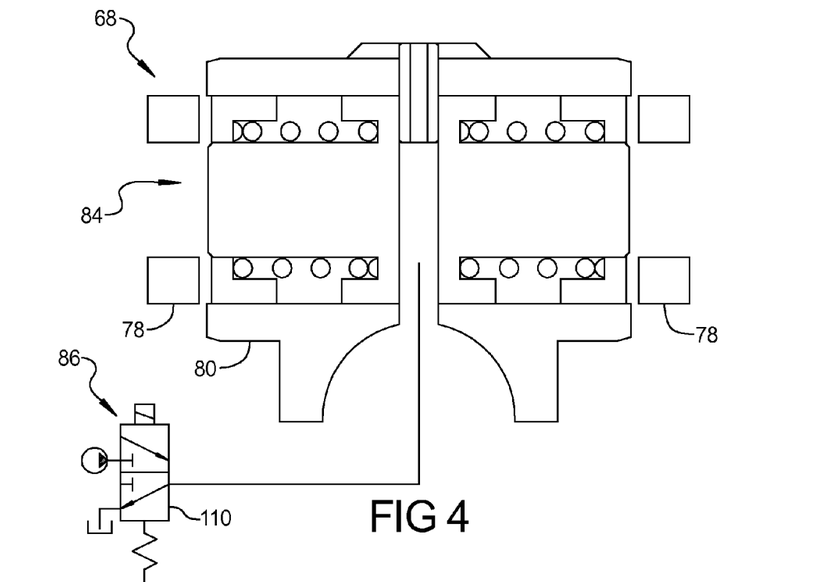
FIG. 4 is a schematic section view of an exhaust valve lift mechanism from the valvetrain assembly shown in FIGS. 2 and 3.
Figure 5:
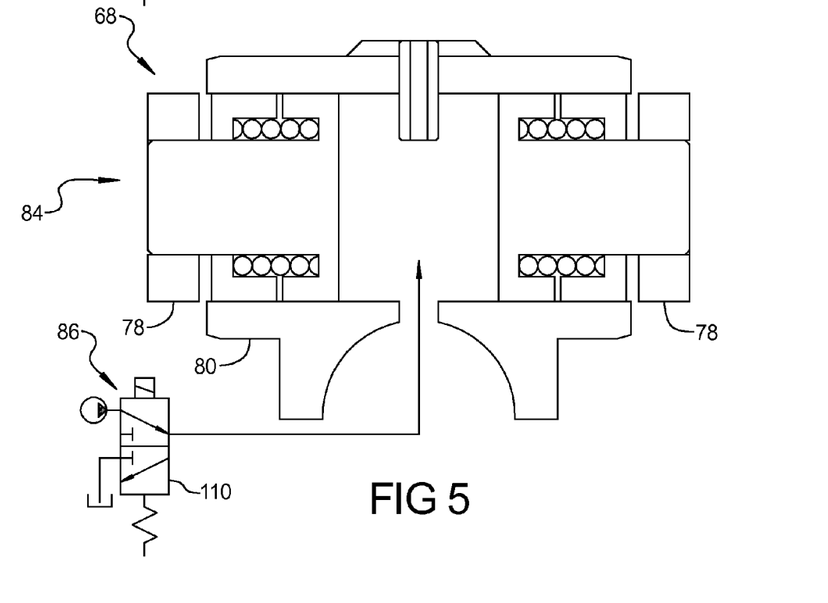
FIG. 5 is an additional schematic section view of the exhaust valve lift mechanism from the valvetrain assembly shown in FIGS. 2 and 3.

The exhaust valve lift mechanisms 68 may form hydraulically actuated deactivating valve lift mechanisms operable in first and second modes. In the present non-limiting example, and as seen in FIGS. 2, 4 and 5, the exhaust valve lift mechanism 68 may be in the form of a rocker arm including a pair of outer arms 78 that define an engagement with the camshaft, an inner arm 80 including a roller 82 and a locking mechanism 84 selectively coupling the outer arms 78 to the inner arm 80. As seen in FIGS. 4 and 5, the locking mechanism 84 may be switched between locked and unlocked positions by a pressurized fluid supply 86. The locking mechanism 84 may secure the outer arms 78 for displacement with the inner arm 80 during the first mode and may allow relative displacement between the outer arms 78 and the inner arm 80 during the second mode. As seen in FIGS. 4 and 5, the exhaust valve lift mechanism 68 may normally be biased to the unlocked position (no internal EGR) and may be switched to the locked position by the pressurized fluid supply 86 (providing internal EGR). However, it is understood that the present disclosure applies equally to arrangements with the exhaust valve lift mechanism 68 being normally biased to the locked position and being switched to the unlocked position by the pressurized fluid supply 86. While both exhaust valve lift mechanisms 68 for each cylinder are shown as deactivating valve lift mechanisms in FIG. 3, it is understood that the present disclosure is not limited to such arrangements and applies equally to arrangements where only one exhaust valve lift mechanism 68 per cylinder is a deactivating valve lift mechanism.

The exhaust camshaft 72 may include EGR cam lobes 88 engaged with each of the outer arms 78 and exhaust cam lobes 90 located between pairs of EGR cam lobes 88 and engaged with the inner arm 80. Each of the EGR cam lobes 88 may define an EGR lift region 92 at least partially rotationally aligned with an intake lift region 94 defined by a corresponding one of the intake cam lobes 74. The exhaust cam lobes 90 may define exhaust lift regions 96 rotationally offset from the EGR lift region 92 and the intake lift regions 94.

The EGR assembly 20 may include an EGR line 98, an EGR cooler 100 and cooler bypass 102 located in the EGR line 98, an EGR control valve 104 and a backpressure control valve 106. The EGR line 98 may extend from the exhaust conduit 48 at a location between the turbocharger 40 and an outlet of the exhaust conduit 48 to the intake system 14 to provide communication between the intake and exhaust systems 14, 16.

In the non-limiting example shown in FIG. 1, the EGR control valve 104 may be located at the outlet of the EGR line 98 and may control exhaust gas recirculation flow to the intake system 14 from the EGR line 98. The backpressure control valve 106 may be located in the exhaust conduit 48 at a location between the EGR line 98 and an outlet of the exhaust conduit 48. In the non-limiting example shown in FIG. 1, the backpressure control valve 106 is located at the outlet of the exhaust conduit 48. The DPF 54 may be located in the exhaust conduit 48 at a location between the exhaust side 58 of the turbocharger 40 and the backpressure control valve 106. The arrangement discussed above provides an internal EGR system in combination with a low pressure EGR system.

The engine assembly 10 may additionally include a control module 108 in communication with the EGR control valve 104 and the backpressure control valve 108. As seen in FIGS. 3-5, the pressurized fluid supply 86 for the exhaust valve lift mechanisms 68 may include oil control valves 110 in communication with and controlled by the control module 108.

The backpressure control valve 106 may be used to control the pressure differential between the intake system 14 and the exhaust system 16 for both the internal EGR system and the low pressure EGR system to adjust recirculation of exhaust gas in the engine assembly 10. The exhaust valve lift mechanisms 68 and the EGR control valve 104 may be adjusted by the control module 108 to provide a desired amount of exhaust gas recirculation during engine operation. The throttle valve 38 and the variable exhaust gas outlet 60 of the turbocharger 40 may also be used to control the pressure differential between the intake system 14 and the exhaust system 16 to further adjust the amount of exhaust gas recirculated in the engine assembly 10. In some arrangements, the EGR assembly 20 may additionally include a bypass passage 112 and a bypass valve 114 located in the bypass passage 112 and in communication with the control module 108. The bypass passage 112 may extend from the exhaust manifold 52 to a region of the intake conduit 32 located between the intake throttle valve 38 and the intake manifold 36 to provide further control of exhaust gas recirculation.

The EGR lift region 92 of the EGR cam lobes 88 provide internal exhaust gas recirculation. The internal EGR system may be used as the high pressure EGR system, eliminating the typical high pressure EGR lines and cooler and the potential for high pressure EGR cooler fouling.

As seen in FIG. 2, the lift regions 92, 94, 96 may generally be defined as regions of the cam lobes 74, 88, 90 including lobe peaks that extend from a base circle region to provide valve lift. The exhaust valve 64 may be displaced to an open position when the peak of the exhaust cam lobe 90 engages the exhaust valve lift mechanism 68 during both the first and second modes. The exhaust valve 64 may be displaced to an open position when the peaks of the EGR cam lobes 88 engage the exhaust valve lift mechanism 68 during the first mode and the exhaust valve 64 may remain in the closed position when the peaks of the EGR cam lobes 88 engage the exhaust valve lift mechanism 68 during the second mode. The EGR cam lobes 88 may provide internal exhaust gas recirculation when the exhaust valve lift mechanism 68 is operated in the first mode.

The base circle region 116 of each of the EGR cam lobes 88 may continuously extend from an end of the EGR lift region 92 to a start of the EGR lift region 92 in a rotational direction of the EGR cam lobes 88. Because the EGR cam lobes 88 only include an EGR lift region 92, an increased time window may be available for switching between the first and second modes. As a result, one oil control valve 110 may be used for a pair of cylinders 22. In the present non-limiting example, a first oil control valve 110 may be used for the first and second cylinders 22-1, 22-2 and a second oil control valve 110 may be used for the third and fourth cylinders 22-3, 22-4.

As seen in FIG. 3, the engine assembly includes first EGR cam lobes 88 and first exhaust cam lobes 90 engaged with first exhaust valve lift mechanisms 68 for the first cylinder 22-1, second EGR cam lobes 88 and second exhaust cam lobes 90 engaged with second exhaust valve lift mechanisms 68 for the second cylinder 22-2, third EGR cam lobes 88 and third exhaust cam lobes 90 engaged with third exhaust valve lift mechanisms 68 for the third cylinder 22-3, and fourth EGR cam lobes 88 and fourth exhaust cam lobes 90 engaged with fourth exhaust valve lift mechanisms 68 for the fourth cylinder 22-4. In the present non-limiting example, the firing order of the cylinders 22 may be first cylinder 22-1, third cylinder 22-3, fourth cylinder 22-4, second cylinder 22-2 and then repeat. The combustion event occurring in the first combustion chamber (first cylinder 22-1) is immediately subsequent to the combustion event in the second combustion chamber (second cylinder 22-2) and the combustion event occurring in the fourth combustion chamber (fourth cylinder 22-4) is immediately subsequent to the combustion event in the third combustion chamber (third cylinder 22-3).

The first and second exhaust valve lift mechanisms 68 may each be in communication with the first oil control valve 110 and the third and fourth exhaust valve lift mechanisms 68 may each be in communication with the second oil control valve 110. In addition to the increased time window being available for switching between the first and second modes, the EGR cam lobes 88 having only an EGR lift region 92 also facilitates the opportunity to have increased exhaust valve opening for the internal exhaust gas recirculation event. A non-limiting example of the opening profiles for the intake and exhaust valves 62, 64 of a cylinder are illustrated in the graph included in FIG. 6. The X-axis in FIG. 6 represents crank angle and the Y-axis represents valve lift.

Figure 6:
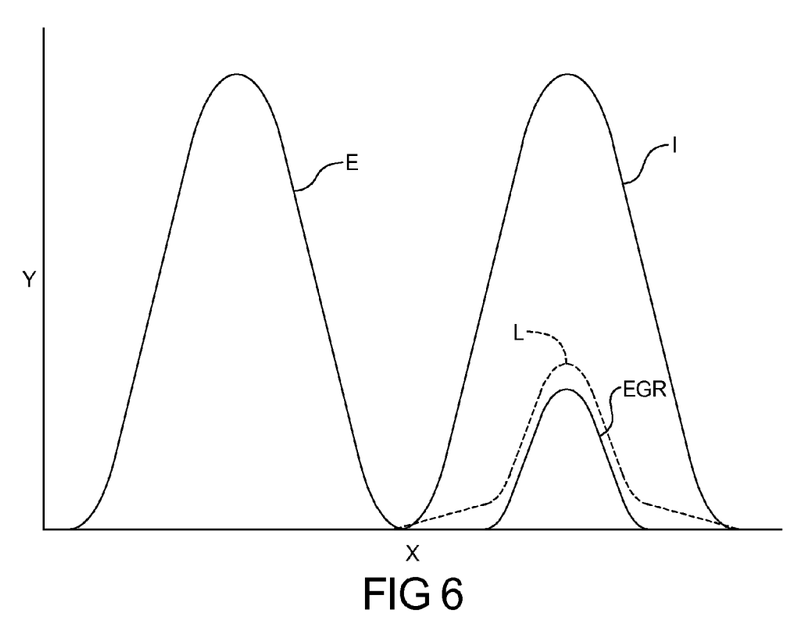
FIG. 6 is a graphical illustration of intake and exhaust valve opening provided by the engine assembly of FIGS. 1-5.

As seen in FIG. 6, the exhaust valve 64 may completely close between an exhaust valve lift event (E) provided by the exhaust cam lobe 90 and a subsequent EGR valve lift event (EGR) provided by the EGR cam lobes 88 during operation of the exhaust valve lift mechanism 68 in the first mode. The lift of the exhaust valve 64 provided during the EGR valve lift event (EGR) may correspond to between twenty percent and sixty percent of the peak lift of the exhaust valve 64 provided during the exhaust valve lift event (E). Additionally, an entirety of the opening of the exhaust valve 64 by the EGR lift region 92 during the first mode may occur while a corresponding intake valve 62 (i.e., intake valve for the same cylinder) is open as illustrated by the intake valve lift event (I).

The lash-less lift (L) illustrated in FIG. 6 corresponds to the lost motion provided by the engagement between the EGR lift region 92 and the exhaust valve lift mechanism 68 during the first mode. More specifically, the outer arms 78 may be displaced by the EGR cam lobe 88 a predetermined amount during the first mode before the exhaust valve 64 is displaced from the closed position. The difference between the lash-less lift (L) and the EGR valve lift event (EGR) in FIG. 6 illustrates a non-limiting example of the lost motion engagement between the EGR lift region 92 of the EGR cam lobe 88 and the outer arms 78 during the first mode. The initial lost motion provided by the engagement between the EGR lift region 92 and the exhaust valve lift mechanism 68 during the first mode may accommodate part tolerances to maintain EGR valve lift event (EGR) outside of the exhaust valve lift event (E) and within the intake valve lift event (I).

During rotation of the exhaust camshaft 72, the base circle region 116 of the EGR cam lobe 88 may be free from contact with the exhaust valve lift mechanism 68. More specifically, the base circle region 116 may always be radially offset from the outer arm 78. The engagement between the EGR cam lobe 88 and the exhaust valve lift mechanism 68 may be limited to the EGR lift region 92. The limited engagement between the EGR cam lobe 88 and the exhaust valve lift mechanism 68 may limit the resulting friction relative to an arrangement where a cam lobe is continuously in contact with a valve lift mechanism.

What is claimed is:

1. An engine assembly comprising:
   an engine structure defining a first combustion chamber and first exhaust port in communication with the first combustion chamber;
   a first exhaust valve located in the first exhaust port;
   a camshaft including:
      a first exhaust cam lobe defining a first exhaust lift region and a first exhaust base circle region; and
      a first EGR cam lobe defining a first EGR lift region and a first EGR base circle region that extends continuously from an end of the first EGR lift region to a start of the first EGR lift region in a rotational direction of the first EGR cam lobe, the first EGR lift region being rotationally offset from the first exhaust lift region in the rotational direction of the camshaft and the first EGR base circle region being rotationally aligned with the first exhaust lift region; and
   a first exhaust valve lift mechanism supported by the engine structure, engaged with the first exhaust cam lobe and the first EGR cam lobe and operable in first and second modes, the first exhaust valve remaining closed when the first EGR lift region engages the first exhaust valve lift mechanism during the second mode and the first exhaust valve being opened when the first EGR lift region engages the first exhaust valve lift mechanism during the first mode to provide exhaust gas flow into the first combustion chamber during an intake stroke of the first combustion chamber, wherein the first exhaust valve lift mechanism includes a first arm engaged with the first exhaust valve and the first exhaust cam lobe and a second arm independent from and coupled to the first arm and engaged with the first EGR cam lobe, the second arm being rotatable relative to the first arm during the second mode and being fixed for rotation with the first arm during the first mode, wherein the first arm includes a roller member engaged with the first exhaust cam lobe and the second arm includes a slider interface that engages the first EGR lift region of the first EGR cam lobe, wherein during rotation of the camshaft, the EGR base circle region of the EGR cam lobe is free from contact with the exhaust valve lift mechanism so that the base circle region is always radially offset from the second arm and the engagement between the EGR cam lobe and the exhaust valve lift mechanism is limited to the EGR lift region.

2. The engine assembly of claim 1, further comprising a second exhaust valve, a second exhaust valve lift mechanism engaged with the second exhaust valve and an oil control valve in fluid communication with the first and second exhaust valve lift mechanisms, the engine structure defining a second combustion chamber and a second exhaust port in communication with the second combustion chamber and the camshaft defining a second exhaust cam lobe and a second EGR cam lobe, the second exhaust valve lift mechanism being engaged with the second exhaust cam lobe and the second EGR cam lobe and being operable in the first and second modes with the second exhaust valve remaining closed when a second EGR lift region of the second EGR cam lobe engages the second exhaust valve lift mechanism during the second mode and the second exhaust valve being opened when the second EGR lift region engages the second exhaust valve lift mechanism during the first mode to provide exhaust gas flow into the second combustion chamber during an intake stroke of the second combustion chamber.

3. The engine assembly of claim 2, wherein the oil control valve switches operation of the first and second exhaust valve lift mechanisms between the first and second modes with the first and second exhaust valve lift mechanisms both being operated in either the first mode or the second mode.

4. The engine assembly of claim 3, wherein a firing order of the engine assembly includes the first combustion chamber having a combustion event immediately subsequent to a combustion event in the second combustion chamber.

5. The engine assembly of claim 1, further comprising an intake valve located in an intake port defined in the engine structure in communication with the first combustion chamber, an intake valve lift mechanism engaged with the intake valve and an intake cam lobe engaged with the intake valve lift mechanism and including an intake lift region and an intake base circle region with the first EGR lift region being rotationally aligned with the intake lift region.

6. The engine assembly of claim 5, wherein an entirety of the first EGR lift region is rotationally aligned with the intake lift region.

7. The engine assembly of claim 1, wherein an exhaust valve lift provided by the first EGR lift region is between 20 percent and 60 percent of an exhaust valve lift provided by the first exhaust lift region.

8. The engine assembly of claim 1, further comprising an exhaust system including an exhaust conduit in communication with the exhaust port, an intake system including a turbocharger in communication with an intake port defined in the engine structure and the exhaust conduit, and an EGR line extending from the exhaust conduit at a location between the turbocharger and an outlet of the exhaust conduit to the intake system and providing communication between the intake and the exhaust system.

9. The engine assembly of claim 8, further comprising a backpressure control valve in the exhaust conduit at a location between the EGR line and the outlet of the exhaust conduit.

10. An engine assembly comprising:
an engine structure defining first and second combustion chambers, a first exhaust port in communication with the first combustion chamber and a second exhaust port in communication with the second combustion chamber;
a first exhaust valve located in the first exhaust port and a second exhaust valve located in the second exhaust port;
a camshaft including:
a first exhaust cam lobe defining a first exhaust lift region;
a first EGR cam lobe defining a first EGR lift region and a first EGR base circle region extending continuously from an ending point of the first EGR lift region to a starting point of the first EGR lift region in a rotational direction of the camshaft;
a second exhaust cam lobe defining a second exhaust lift region; and
a second EGR cam lobe defining a second EGR lift region and a second EGR base circle region extending continuously from an ending point of the second EGR lift region to a starting point of the second EGR lift region in the rotational direction of the camshaft;
a first exhaust valve lift mechanism supported by the engine structure, engaged with the first exhaust cam lobe and the first EGR cam lobe and operable in first and second modes, the first exhaust valve remaining closed when the first EGR lift region engages the first exhaust valve lift mechanism during the second mode and being opened when the first EGR lift region engages the first exhaust valve lift mechanism during the first mode to provide exhaust gas flow into the first combustion chamber during an intake stroke of the first combustion chamber, wherein the first exhaust valve lift mechanism includes a first arm engaged with the first exhaust valve and the first exhaust cam lobe and a second arm independent from and coupled to the first arm and engaged with the first EGR cam lobe, the second arm being rotatable relative to the first arm during the second mode and being fixed for rotation with the first arm during the first mode;
a second exhaust valve lift mechanism supported by the engine structure, engaged with the second exhaust cam lobe and the second EGR cam lobe and operable in the first and second modes, the second exhaust valve remaining closed when the second EGR lift region engages the second exhaust valve lift mechanism during the second mode and being opened when the second EGR lift region engages the second exhaust valve lift mechanism during the first mode to provide exhaust gas flow into the second combustion chamber during an intake stroke of the second combustion chamber, wherein the second exhaust valve lift mechanism includes a third arm engaged with the second exhaust valve and the second exhaust cam lobe and a fourth arm independent from and coupled to the third arm and engaged with the second EGR cam lobe, the fourth arm being rotatable relative to the third arm during the second mode and being fixed for rotation with the third arm during the first mode; and
an oil control valve in fluid communication with the first and second exhaust valve lift mechanisms and operable to switch both the first and second exhaust valve lift mechanisms between the first and second modes,
wherein the first and third arms include a roller member engaged with the first and second exhaust cam lobes, respectively, and the second and fourth arms include a slider interface that engage the first and second EGR lift regions of the first and second EGR cam lobes, wherein during rotation of the camshaft, the EGR base circle regions of the first and second EGR cam lobes are free from contact with the first and second exhaust valve lift mechanisms so that the base circle regions are always radially offset from the second and fourth arms and the engagement between the first and second EGR cam lobes and the first and second exhaust valve lift mechanisms are limited to the first and second EGR lift regions.

11. The engine assembly of claim 10, wherein a firing order of the engine assembly includes the first combustion chamber having a combustion event immediately subsequent to a combustion event in the second combustion chamber.

12. The engine assembly of claim 10, further comprising an intake valve located in an intake port defined in the engine structure in communication with the first combustion chamber, an intake valve lift mechanism engaged with the intake valve and an intake cam lobe engaged with the intake valve lift mechanism and including an intake lift region and an intake base circle region with the first EGR lift region being rotationally aligned with the intake lift region.

13. The engine assembly of claim 12, wherein an entirety of the first EGR lift region is rotationally aligned with the intake lift region.

14. The engine assembly of claim 10, wherein an exhaust valve lift provided by the first EGR lift region is between 20 percent and 60 percent of an exhaust valve lift provided by the first exhaust lift region and an exhaust valve lift provided by the second EGR lift region is between 20 percent and 60 percent of an exhaust valve lift provided by the second exhaust lift region.

* * * * *